United States Patent
Maier

(10) Patent No.: US 7,241,392 B2
(45) Date of Patent: Jul. 10, 2007

(54) ROTARY SEPARATOR AND METHOD

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 11/221,434

(22) Filed: Sep. 8, 2005

(65) Prior Publication Data
US 2006/0157406 A1 Jul. 20, 2006

Related U.S. Application Data

(60) Provisional application No. 60/608,296, filed on Sep. 9, 2004.

(51) Int. Cl.
*B01D 21/26* (2006.01)
(52) U.S. Cl. .................. 210/784; 210/787; 210/380.1; 210/512.3; 494/35; 494/49; 494/51; 494/60; 96/155; 95/241; 95/261; 95/270; 55/405
(58) Field of Classification Search ................ 210/784, 210/787, 380.1, 512.3; 494/49, 51, 60, 35; 96/155; 95/241, 261, 270; 55/405
See application file for complete search history.

(56) References Cited

U.S. PATENT DOCUMENTS 4,278,200 A * 7/1981 Gunnewig .................... 494/35
5,693,125 A * 12/1997 Dean ........................... 96/157

FOREIGN PATENT DOCUMENTS

WO WO 00/74811 A1 * 12/2000

* cited by examiner

*Primary Examiner*—David A. Reifsnyder
(74) *Attorney, Agent, or Firm*—Michael Best & Friedrich LLP

(57) ABSTRACT

A separator and method according to which substances having relatively high densities are separated from a pressurized flow stream.

49 Claims, 5 Drawing Sheets

ROTARY SEPARATOR AND METHOD

CROSS REFERENCE TO RELATED APPLICATIONS

The present application claims the benefit of the filing date of U.S. provisional patent application Ser. No. 60/608,296, filed on Sep. 9, 2004, the disclosure of which is incorporated herein by reference.

The present application is related to the following applications: U.S. provisional patent application Ser. No. 60/608,296, filed on Sep. 9, 2004; and U.S. utility patent application Ser. No. 10/983,980, filed on Nov. 8, 2004, the disclosures of which are incorporated herein by reference.

BACKGROUND

The present disclosure relates in general to a separator and in particular to a separator for separating substances having relatively high densities, such as solids, liquids and/or gases having relatively high densities, from solids, liquids and/or gases having relatively low densities in a pressurized flow stream such as, for example, a natural gas flow stream.

During the operation of a typical rotary separator, a vortical flow is developed in the process stream as it flows through a rotating drum. The fluid is subjected to an inertial acceleration field, resulting in centrifugal forces directed radially outward towards the inner surface of the drum. The substances having relatively high densities in the vortical flow stream, such as liquids, are subject to the highest centrifugal forces. Thus, liquids present in the flow stream are centrifuged and captured against the inner surface of the drum, thereby radially separating the liquids (high-density substances) from the gas (low-density substances). As a result, a "clean" or substantially non-liquid-transporting gas flow stream exits axially from the drum and flows downstream of the rotary separator.

However, several problems may arise during the operation of a typical rotary separator. For example, a rotary separator may require one or more bearing assemblies to support one or more components such as, for example, a rotating shaft, and these bearing assemblies may in turn require costly case separations and seal systems to ensure proper bearing and/or separator functions.

Also, a secondary flow stream may be driven around the outside of the drum in response to one or more factors such as, for example, flow resistances associated with the rotating drum. Since the secondary flow stream has not undergone rotary separation in the drum, it may transport liquid and/or other contaminants which then may be reintroduced into the flow stream downstream of the drum. Thus, re-contaminated gas (or liquid-carrying gas) may be transported downstream of the separator, frustrating the purpose of the separator.

Therefore, what is needed is a separator and/or method that overcomes one or more of the above-described problems, among others.

DETAILED DESCRIPTION

Figure 1:
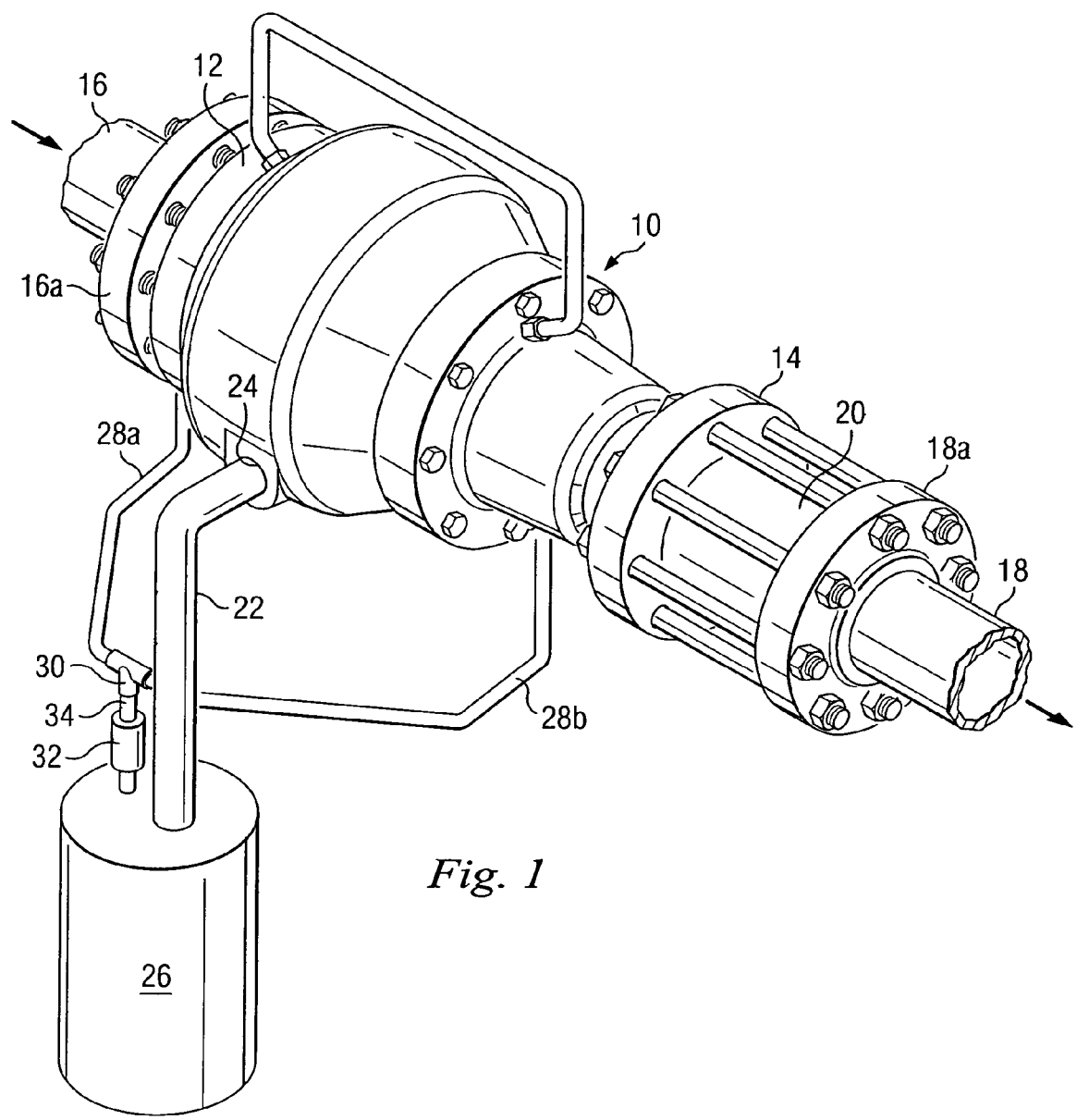
FIG. 1 is a perspective view of a separator according to an embodiment of the invention.
Figure 2:
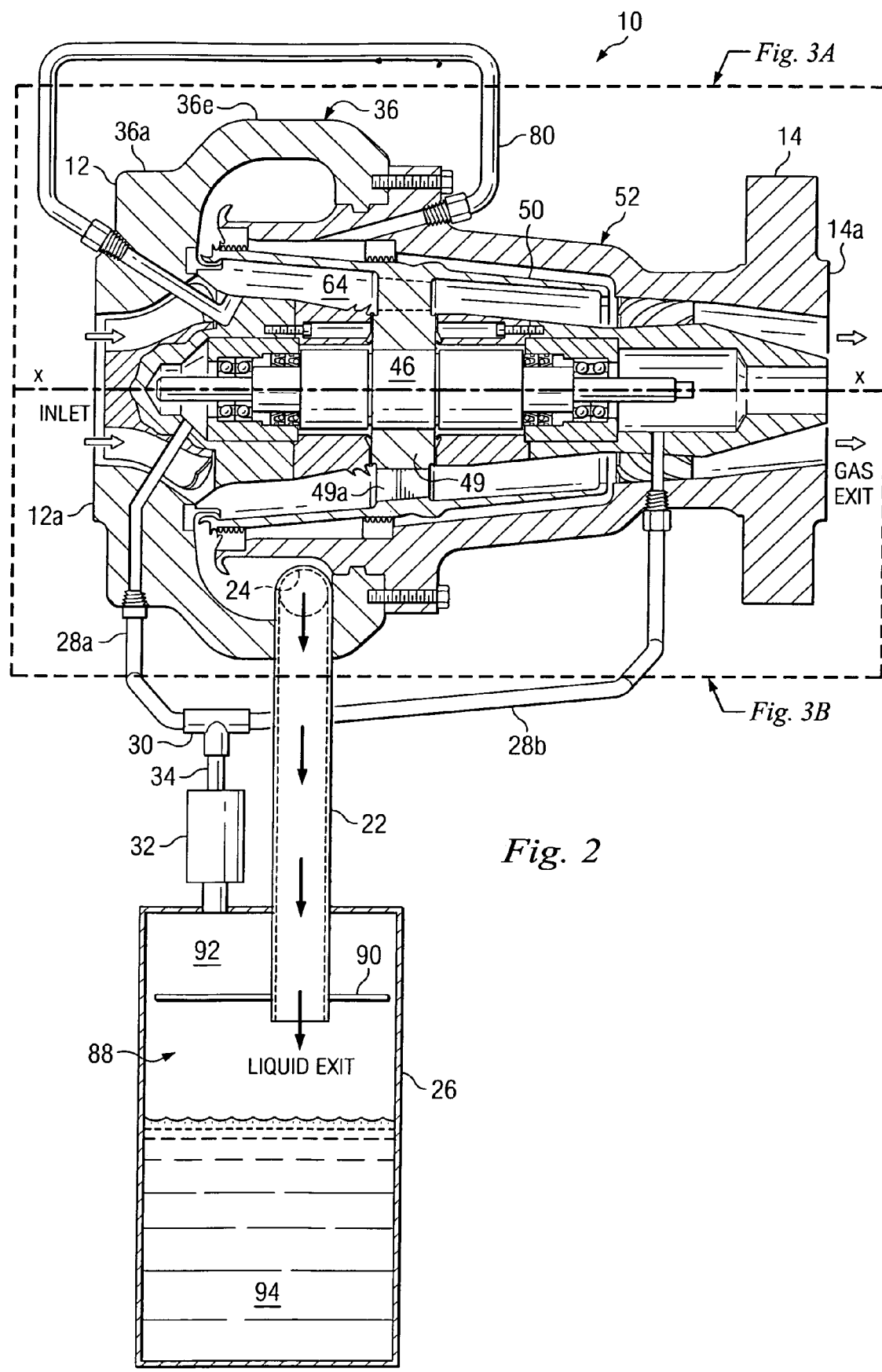
FIG. 2 is a sectional view of the separator of FIG. 1 and depicts a longitudinal axis x—x.

Referring to FIG. 1, the reference numeral 10 refers, in general, to a separator 10 used to separate solids, liquids and/or gases having relatively high densities from solids, liquids and/or gases having relatively low densities in a pressurized flow stream such as, for example, a natural gas flow stream. For clarity purposes, the substances to be separated, that is, the substances with relatively high densities, will be referred to as "liquid(s)," whereas the substances with relatively low densities will be referred to as "gas."

The separator 10 includes an inlet flange 12 and an outlet flange 14, and is adapted for in-line pipe installation. A pipe section 16 is connected to the inlet flange 12 via a flange 16a. A pipe section 18 is connected to a flange 18a and a conventional cut-to-fit tubular member 20 extends between the flange 18a and the outlet flange 14 of the separator 10. The pipe sections 16 and 18 are adapted to transport a pressurized gas flow stream to and away from the separator 10, respectively, as indicated by the flow arrows.

A line 22 is connected to a liquid tangential drain port 24 formed in the separator 10. A vessel 26 is connected to and in fluid communication with the separator 10 via the line 22 and the port 24. Lines 28a and 28b are each connected to the separator 10 at opposing ends of the separator, and meet at a tee 30, as will be described in further detail below. A coalescing filter 32 is connected to the tee 30 via a line 34 that also extends from the filter to the vessel 26.

Referring to FIGS. 2–5, with continuing reference to FIG. 1, the separator 10 defines a longitudinal axis x—x and includes an inlet housing 36 having a base portion 36a that defines the flange 12 and a flange surface 12a. It is understood that the flange 16a defines a flange surface (not shown) that is substantially similar to the flange surface 12a, and that the flange surface of the flange 16a sealingly engages the flange surface 12a, and/or one or more sealing elements sandwiched therebetween, to form a continuous flow passage between the pipe section 16 and the separator 10.

An axially-extending tapered annular protrusion 36b (FIGS. 3A and 3B) having an end 36c extends from the base portion 36a. A pointed annular protrusion 36b' extends from the protrusion 36b. A variable-diameter cavity 36d is formed in the end 36c. A ring 36e, having a generally dome-shaped cross-section, extends axially from the base portion 36a and circumferentially around the protrusion 36b.

A plurality of stator vanes 36f are formed in the base portion 36a and the protrusion 36b, and extend from the surface 12a to the outer surface of the protrusion 36b adjacent the base portion. Each pair of vanes in the plurality of stator vanes 36f is adapted to define a flow path for a volumetric portion of the gas flow stream, for reasons to be described. Each flow path defined by each pair of stator vanes 36f is initially parallel with the longitudinal axis x—x of the separator 10, and then develops in a radial and tangential (in this example counterclockwise) direction about the longitudinal axis x—x, as viewed in the direction of the flow arrow entering the pipe section 16 in FIG. 1. It is understood that the stator vanes 36f may be modified so that each flow path defined by each pair of stator vanes 36f develops radially and tangentially in another direction such as, for example, a clockwise direction.

Figure 3A:
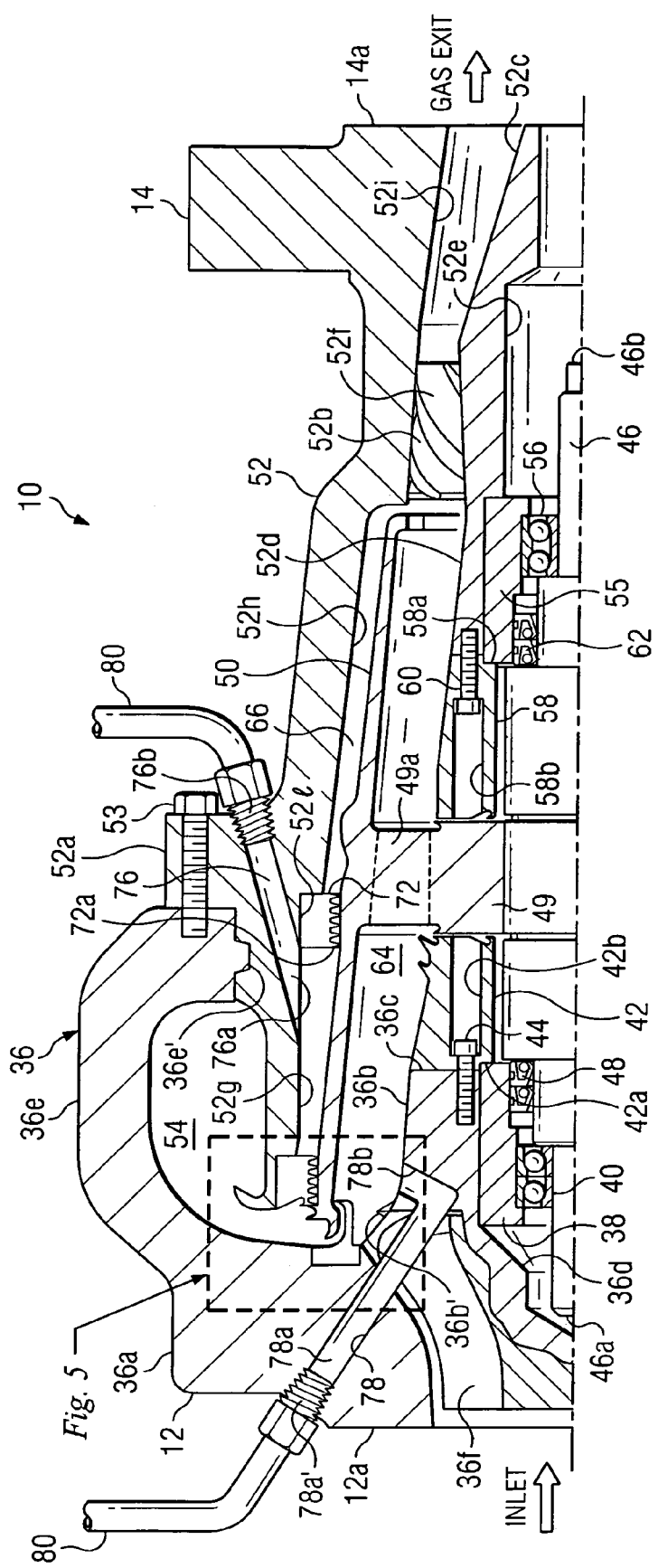
FIG. 3A is an enlarged view depicting a portion of the sectional view of FIG. 2 above the longitudinal axis x—x.
Figure 3B:
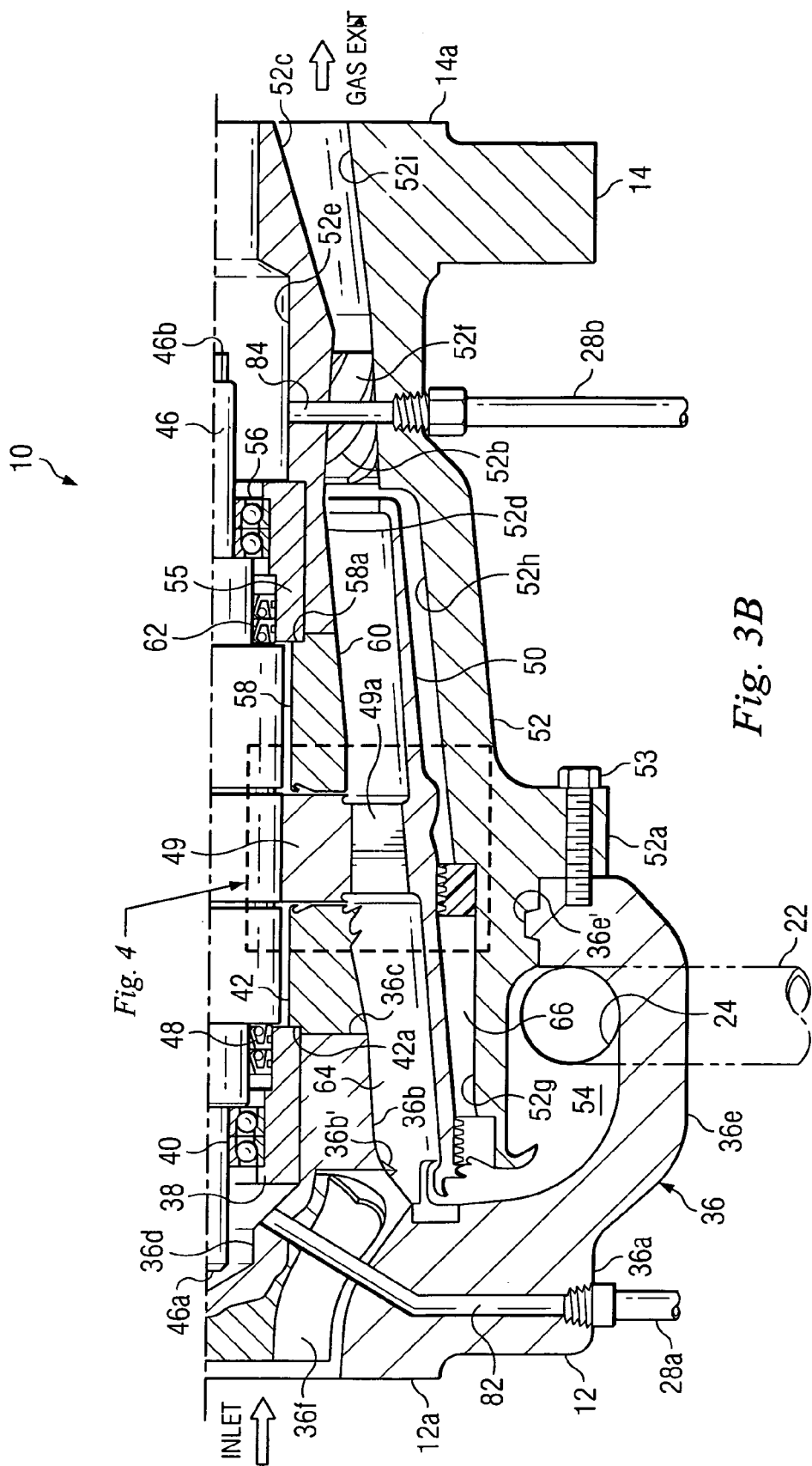
FIG. 3B is an enlarged view depicting a portion of the sectional view of FIG. 2 below the longitudinal axis x—x.

A tubular member or bearing housing 38 is disposed in the cavity 36d and houses a bearing assembly 40. The bearing assembly 40 includes two rows of rolling-element-type bearings with grease-pack lubrication. A tubular member or casing 42 having a shoulder 42a is connected to the protrusion 36b, via a plurality of fasteners 44, so that the shoulder engages an end of the bearing housing 38, thereby holding the bearing housing in place. Each fastener 44 extends through a counterbore 42b formed in the casing 42 (one fastener and corresponding counterbore are shown in FIG. 3A).

A plurality of protrusions or teeth 42c (FIG. 4) are formed in the distal end of the casing 42. A pair of rings 42d and 42e extends circumferentially about and radially outward from the outer surface of the casing 42 at the distal end portion of the casing. The rings 42d and 42e are angled so that the rings also extend axially in the direction of fluid flow as indicated by the flow arrows in FIG. 1.

A variable-diameter shaft 46 extends through the casing 42, the bearing housing 38 and the bearing assembly 40 so that an end 46a of the shaft extends into the cavity 36d. A pair of sealing elements such as, for example, a pair of elastomer lip seals 48, is connected to the inner surface of the bearing housing 38 and extends radially inward, sealingly engaging an outer surface of the shaft 46.

An annular rotor disk 49 is connected to and surrounds the center region of the shaft 46 so that the teeth 42c extend towards and nearly contact a wall of the rotor disk. The rotor disk 49 includes a plurality of blades 49a extending radially outward from the outer surface of the casing 42, across the fluid flowpath and to an inner surface of a rotor drum 50. The drum 50 is connected to the distal ends of the blades 49a. The drum 50 is in the form of an axisymmetric tapered shell, extends axially in both directions from the center region of the shaft 46, and extends circumferentially, inter alia, around the protrusion 36b and the casing 42. It is understood that one or more additional blades may extend radially outward from the outer surface of the rotor disk 49, with the distal ends of the additional blades not being connected to the drum 50 and instead being positioned at any radial position between the drum and the outer surface of the rotor disk.

A generally cylindrical outlet housing 52 is connected to the inlet housing 36 via a plurality of fasteners 53 extending through a flange 52a and into the ring 36e. A sealing element such as an elastomer O-ring 36e' sealingly fits in an annular channel formed in the outlet housing 52 to form a pressure sealing engagement between the local inner surface of the inlet housing 36 and the outlet housing. A chamber 54 is defined by the inner surface of the ring 36e and the portion of the outer surface of the outlet housing 52 that is disposed within the ring. The housing 52 defines the flange 14 and a flange surface 14a, and it is understood that the flange surface sealingly engages an end of the tubular member 20, and/or one or more sealing elements sandwiched therebetween, to form a continuous flow passage between the separator 10 and the tubular member.

The outlet housing 52 includes a radially-extending diffuser portion 52b, and a tapered protrusion 52c extending axially downstream from the center of the diffuser portion. A protrusion 52d extends axially upstream from the center of the diffuser portion 52b. A variable-diameter bore 52e is formed through the protrusion 52d, the diffuser portion 52b and the protrusion 52c. A plurality of diffuser vanes 52f is formed in and extend across the outer surface of the diffuser portion 52b. Each pair of vanes in the plurality of diffuser vanes 52f is adapted to define a flow path for a volumetric portion of the gas flow stream, for reasons to be described.

The outlet housing 52 also defines inner surfaces 52g, 52h and 52i. It is understood that the plurality of diffuser vanes 52f radially extends across the fluid flowpath region of the outlet housing 52 between the inner surface 52i and the remainder of the diffuser portion 52b.

A tubular member or bearing housing 55 is disposed in the region of the bore 52e formed through the protrusion 52d, and houses a bearing assembly 56. The bearing assembly 56 includes two rows of rolling-element-type bearings with grease-pack lubrication. A tubular member or casing 58 having a shoulder 58a is connected to the protrusion 52d, via a plurality of fasteners 60, so that the shoulder engages an end of the bearing housing 55, thereby holding the bearing housing in place. Each fastener 60 extends through a corresponding counterbore 58b formed in the casing 58 (one fastener and corresponding counterbore are shown in FIG. 3A).

A plurality of protrusions or teeth 58c (FIG. 4) are formed in the end of the casing 58 opposing the shoulder 58a. The teeth 58c extend towards and nearly contact a wall of the rotor disk 49 opposing the wall of the rotor disk nearly contacted by the teeth 42c.

The shaft 46 extends through the casing 58 and the bearing housing 55 so that an end 46b of the shaft extends into the region of the bore 52e formed through the diffuser portion 52b and the protrusion 52c. A pair of elastomer lip seals 62 is connected to the inner surface of the bearing housing 55 and extends radially inward, sealingly engaging an outer surface of the shaft 46.

The drum 50 extends circumferentially around the casing 58 and the bearing housing 55. An annular flow region 64 is defined by the inner surface of the drum 50 and the outer surfaces of the protrusions 36b and 52d, the casings 42 and 58, and the rotor disk 49. An annular region 66 is defined by the outer surface of the drum 50 and the surfaces 52g and 52h of the outlet housing 52.

Figure 5:
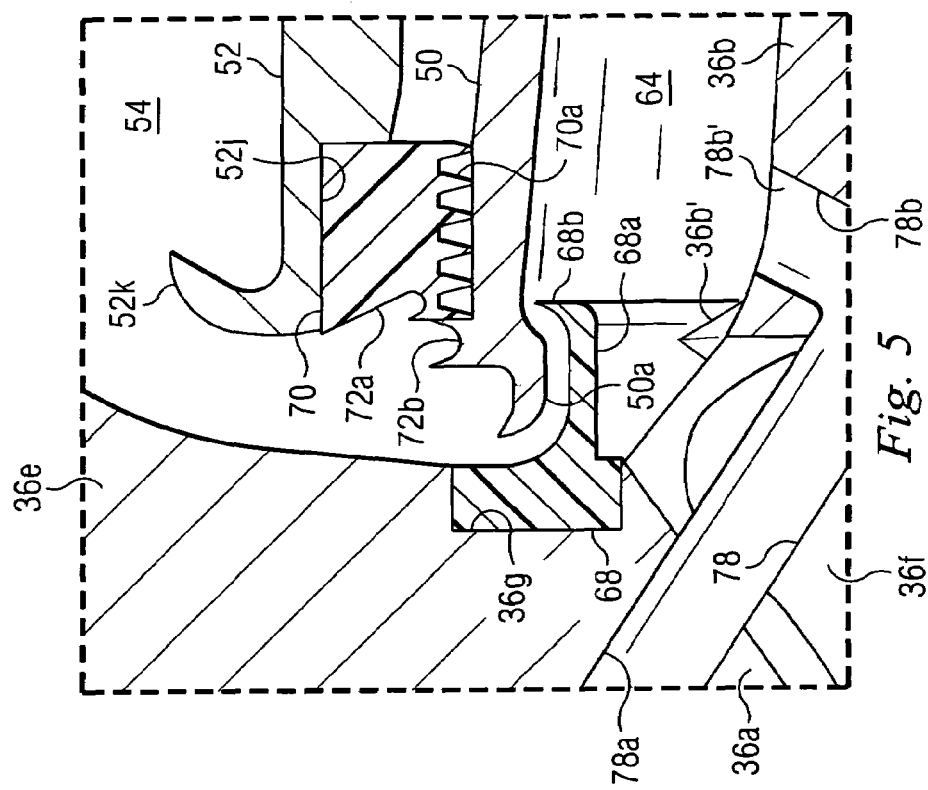
FIG. 5 is an enlarged view of a portion of the view depicted in FIG. 3A.
Figure 4:
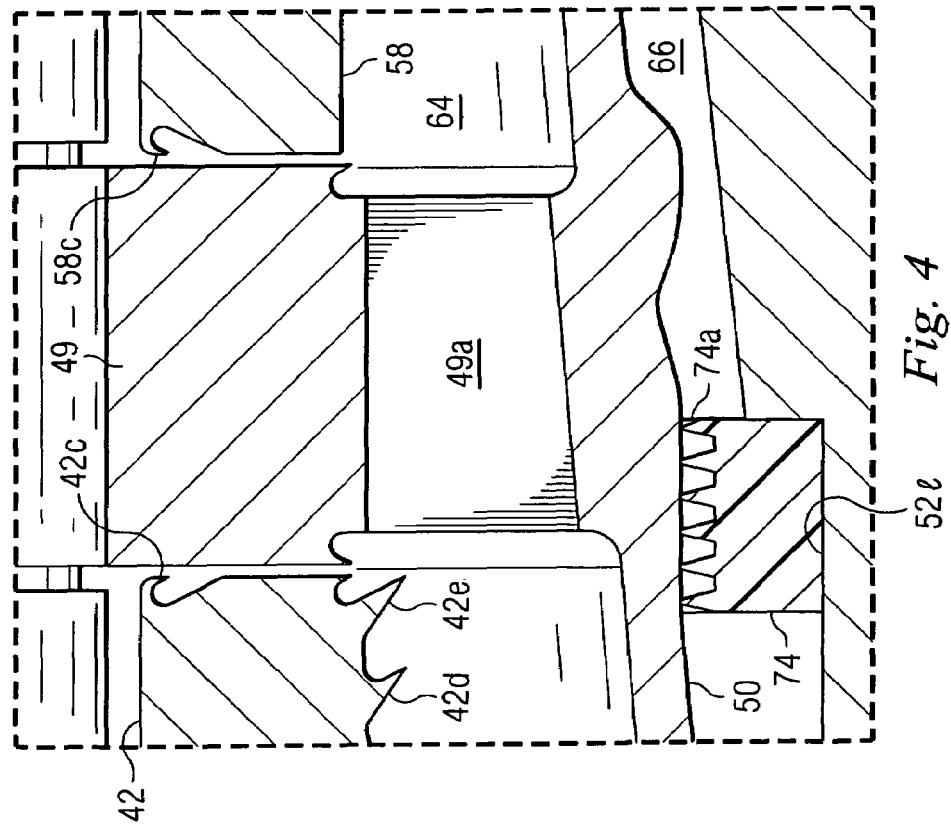
FIG. 4 is an enlarged view of a portion of the view depicted in FIG. 3B.

As shown in FIG. 5, a circumferentially-extending curved lip or step 50a is formed in an end portion of the drum 50 so that the surface defined by the step is radially inwardly offset from the remainder of the inner surface of the drum. A ring 68 is disposed in and connected to a wall of a channel 36g formed in the base portion 36a of the inlet housing 36. The ring 68 includes a protrusion 68a that extends axially in a direction away from the base portion 36a. A protrusion or static tooth 68b extends radially outward from the distal end of the protrusion 68a so that the distal end of the tooth is adjacent or near the fillet that defines the transition from the inner surface of the drum 50 and the step 50a.

A circumferentially-extending channel 52j is formed in the inner surface of the outlet housing 52 at an end of the outlet housing. A curved lip 52k extends radially outward from the end of the outlet housing 52 in which the channel 52j is formed. The curvature of the lip 52k corresponds to the curvature of the inner wall of the ring 36e opposing the lip. An annular labyrinth or drum seal 70 is disposed in and connected to the walls of the channel 52j. The seal 70 includes a plurality of axisymmetric teeth 70a extending radially inward and offset from the outer surface of the drum 50. A pair of circumferentially-extending notches 72a and 72b are formed in the seal 70 and the outer surface of the drum 50, respectively.

A circumferentially-extending channel 52l (FIG. 4) is formed in the inner surface of the outlet housing 52. An annular labyrinth or drum seal 74 is disposed in and connected to the walls of the channel 52l. The seal 74 includes a plurality of axisymmetric teeth 74a extending radially inward and offset from the outer surface of the outlet housing 52.

A passage 76 (FIG. 3A) extends within the outlet housing 52, extending radially outward from the surface 52g to an outer surface of the flange 52a, and at an acute angle, relative to the longitudinal axis x—x of the separator 10. The intersection of the passage 76 with the surface 52g defines an inlet 76a of the passage that is axially positioned between the seals 70 and 74. The intersection of the passage 76 with the outer surface of the flange 52g defines an outlet 76b of the passage. It is understood that the passage 76 may be formed in the outlet housing 52 and/or may be a separate line connected to the outlet housing 76.

A passage 78 extends within the base portion 36a and the protrusion 36b of the inlet housing 36. An upstream portion 78a of the passage 78 extends radially inward, in an angled direction, from an outer surface of the flange 12 radially outside of the flange surface 12a. A downstream portion 78b of the passage 78 extends radially outward, in an angled direction, to the outer surface of the protrusion 36b downstream from the plurality of stator vanes 36f. The intersection of the passage 78 with the outer surface of the flange 12 defines an inlet 78a' of the passage, and the intersection of the passage with the outer surface of the protrusion 36b defines an outlet 78b' of the passage. It is understood that the passage 78 may be formed in the inlet housing 36 and/or may be a separate line connected to the inlet housing 36.

A line 80 is fluidically connected to the passage 76 at the surface of the flange 52a in any conventional manner, extends between the flange 52a and the flange 12, and is fluidically connected to the passage 78 in any conventional manner, thereby fluidically connecting the passages 76 and 78.

A passage 82 (FIG. 3B) is formed in the base 36a of the inlet housing 36. The passage 82 extends radially outward from the cavity 36d, and then extends downward and through an outer surface of the base. Alternatively, it is understood that the passage 82 may be defined by a line or tubular member extending within the inlet housing 36. The line 28a is connected to the passage 82 at the outer surface of the base 36a in any conventional manner, thereby fluidically connecting the cavity 36d with the line.

A bore 84 is formed in the outlet housing 52, extending upwards from the lower portion of the outer surface of the housing to the region of the bore 52e formed through the diffuser portion 52b. Alternatively, it is understood that the bore 84 may be defined by a line or tubular member extending within the outlet housing 52. The line 28b is connected to the bore 84 at the outer surface of the outlet housing 52 in any conventional manner, thereby fluidically connecting the bore 52e with the line.

The lines 28a and 28b each extend downward from the separator 10 and then extend towards the tee 30 disposed between and connecting the lines. It is understood that the sections of the line 28a and 28b extending towards the tee 30 may be sloped to promote liquid drainage to the tee. As described above, a coalescing filter 32 is connected to the tee 30 via the line 34 that also extends to the vessel 26. It is understood that the coalescing filter 32 may include a filter media that is adapted to collect aerosols flowing upwards through the line 34 from the vessel 26, thereby enabling the collected aerosols to emerge as droplets on the surface of the media and gravitationally drain back into the vessel.

The line 22 extends through the top of the vessel 26 and into a reservoir or chamber 88 (FIG. 2) defined by the vessel. A radially-extending panel 90 is connected to the distal end portion of the line 22. A quiescent region 92 of the chamber 88 is defined between the panel 90 and the ceiling or top surface of the chamber, and a liquid-collection region 94 is defined between the panel and the floor or bottom surface of the chamber.

In operation, a pressurized flow stream enters the plurality of stator vanes 36f of the separator 10 via the pipe section 16. The flow stream enters the separator 10 at a flow pressure termed the "inlet pressure," and at a volumetric flow rate. It is understood that liquids are present in the flow stream upon entry into the separator 10 and that it is desired to separate the liquids from the flow stream via the separator. Thus, the flow stream is cleaned or "scrubbed" by the separator 10, and clean gas (or non-liquid-transporting gas) flows downstream of the separator 10 via the pipe section 18.

The flow stream is circumferentially divided as different portions of the gas travel through the multiple flow paths defined by the pairs of stator vanes 36f. Due to the tangential curvature and area reduction of the flow paths defined by the pairs of stator vanes 36f, the flow stream exits the stator vanes 36f and enters the annular flow region 64 having a high swirl velocity with respect to the rotational axis of the rotor disk 49 and the drum 50. In this example, the flow stream swirls in a counterclockwise direction about the protrusion 36b, the casing 42, the rotor disk 49, the casing 58 and the protrusion 52, between the blades 49a, and towards the pipe section 18. It is understood that the stator vanes 36f may be modified so that the flow stream swirls in another direction such as, for example, a clockwise direction.

The vortical nature of the flow stream creates a high "g" (or high acceleration) centrifugal force field in the annular flow region 64. That is, due to its large circumferential velocity, the flow stream is subjected to an inertial acceleration field, resulting in induced, circumferentially-extending centrifugal forces that are directed radially outward towards the inner surface of the drum 50. The substances in the vortical flow stream that have relatively high densities, such as liquids, are subjected to the highest centrifugal forces. Thus, the liquids are centrifuged or "forced" radially outward against the inner surface of the drum 50, thereby separating the liquids (or high-density substances) from the gas (or low-density substances).

As a result of the vortical flow stream, and due to the combination of viscous drag on the inner surface of the drum 50 and momentum or energy transfer from the vortical flow stream to the blades 49a, the drum and the blades rotate (counterclockwise as viewed in the direction of the flow arrow entering the pipe section 16 in FIG. 1 in this example). The rotor disk 49 and the shaft 46 rotate along with the drum 50 and the blades 49a, with the bearing assemblies 40 and 56 supporting the rotating shaft 46. The protrusions 36b and 52d and the casings 42 and 58 are stationary so that the annular flow region 64 is in part defined by a rotating surface (the inner surface of the rotating drum 50) and a fixed surface (the outer surfaces of the protrusions and the casings). Thus, the separator 10 is self-powered and free-spinning, relying on the inlet pressure to rotate the drum 50.

The rotation of the drum 50 provides continual centrifugal forces that are directed radially outward, causing the entrained liquid to remain on or "stick" against the inner surface of the rotating drum, and separate from the gas. Further, an appreciable fluid shear boundary is not formed because the drum 50 and the vortical flow stream are moving at approximately the same rotational speed, thereby promoting the formation of a circumferentially-extending, smooth and distinct liquid layer on the inner surface of the drum.

The rotation and the tapered profile of the drum 50 also forces the entrained liquid on the inner surface of the drum to flow towards the step 50a. The flowing liquid collects and forms a circumferentially-extending pool adjacent the step 50a and at the fillet defining the transition from the step 50a to the remainder of the inner surface of the drum 50. When the depth of the pool reaches a predetermined level, a liquid film having a predetermined and controlled thickness discharges radially outward from the step 50a and into the chamber 54. The liquid film discharges in an axisymmetric manner, that is, the discharge occurs from substantially along the entire circumferential length of the step 50a. Thus, a more orderly transition of the liquid from the rotating drum 50 to the static chamber 54 is achieved.

The static tooth 68b extends into the pool formed adjacent the step 50a. Both the rotating step 50a and the static tooth 68b serve as barriers to any gas in the annular flow region 64 seeking to flow over the step 50a and into the chamber 54. Thus, any unwanted commingling of gas and liquid discharging off of the step 50a is minimized.

The combination of the step 50a and the static tooth 68b results in a minimal variation of the thickness of the liquid film discharging from the step 50a, regardless of the amount of variation of the volumetric flow rate of the flow stream through the pipe section 16, the separator 10 and the pipe section 18. Thus, the rate of liquid discharge from the annular flow region 64 is not appreciably dependent upon the flow rate of the flow stream, thereby enabling the separator 10 to operate over a wide flow rate range. It is understood, however, that any slight variation in the liquid-discharge rate may be proportional to a variation in the process flow rate.

Furthermore, the above-described axisymmetric liquid discharge from the drum 50, and the combination of the step 50a and the static tooth 68b, enables both the inner and outer diameters of the drum to be minimized. Minimization of the inner diameter of the drum 50 minimizes the energy loss in the liquid flowing towards the step 50a on the inner surface of the drum. Minimization of the outer diameter of the drum 50 minimizes windage losses from the outside surface of the drum, thereby maximizing the rotational speed of the drum.

After discharging from the step 50a, the liquid film sprays onto the static (non-rotating) walls of the ring 68, the base portion 36a and/or the ring portion 36e, and the surface friction associated with one or more of these walls slows the velocity of the discharged liquid down from a relatively high spray velocity to a relatively low drain velocity.

The liquid in the chamber 54 drains out of the separator 10 via the tangential drain port 24 and the line 22, collecting in the liquid collection region 94 of the vessel 26. The lip 52k serves as a gutter, promoting drainage of the liquid to the vessel 26 via the port 24 and the line 22, and generally preventing liquid in the chamber 54 from remixing with, for example, a secondary flow stream described herein below.

It is understood that the axisymmetric liquid-film discharge off of the step 50a, the surface friction associated with the walls of the ring 68, the base portion 36a and/or the ring portion 36e, and/or the lip 52k may contribute to a more orderly transition of the liquid from the rotating drum 50 to the static chamber 54, thereby promoting efficient drainage from the chamber 54 and to the liquid collection vessel 26.

As a result of the above-described separation and drainage process, clean gas in the flow stream (or non-liquid-transporting gas) enters the diffuser portion 52b. The flow paths defined by the diffuser vanes 52f minimize exit swirl and expand the flow, thereby recovering a portion of the kinetic energy of the flow stream. The increase in the annular cross-sectional area from the plurality of diffuser vanes 52f to the flange surface 14a assists in exit-swirl minimization and kinetic-energy recovery.

The pressure of the flow stream drops as the flow stream traverses through the separator 10. That is, the inlet pressure, or the static pressure of the pipe section 16, is greater than the static pressure of the pipe section 18 because of the pressure loss due to the surface friction between the flow stream and the surfaces of the various components of the separator 10 which engage the flow stream, and because of the pressure loss due to the above-described energy transfer between the flow stream and the rotating drum 50 and the blades 49a of the rotor disk 49.

This flow resistance and accompanying pressure drop may tend to drive a secondary flow stream in a direction towards the tooth 68b and the step 50a, and out of the annular flow region 64. The secondary flow stream of gas may then flow around the step 50a, between the teeth 70a of the seal 70, into and through the annular region 66, and back into the annular flow region 64 and through the diffuser portion 52b, exiting the separator 10. Thus, secondary flow stream avoids the viscous drag on the inner surface of the drum 50 and the momentum transfer to the blades 49a.

This secondary flow stream may be able to carry at least a portion of the liquid in the pool formed adjacent the step 50a, or any other entrained liquid, in the secondary flow stream, thereby increasing the possibility of reintroducing liquid back into the flow stream immediately before its entrance into the diffuser portion 52b. Thus, re-contaminated gas may possibly be transported downstream via the pipe section 18, frustrating the purpose of the separator 10.

To combat this potential for re-contamination, the curved notches 72a and 72b are shaped to sling at least a portion of any liquid in the secondary flow stream away from the drum seal 70, thereby possibly sending the liquid to the chamber 54 for drainage. Moreover, the drum seals 70 and 74 may limit the flow rate of the secondary flow stream, with the teeth 70a and 74a, respectively, providing significant fluidic resistance in view of their proximity to the outer surface of the rotating drum 50. The secondary flow stream that does flow past the drum seal 70 enters a portion of the annular region 66 that is axially disposed between the drum seals 70 and 74. The portion of the annular region 66 between the drum seals 70 and 74 has a higher pressure than the pressure of the portion of the annular flow region 64 that is proximate the outer surface of the protrusion 36b (at the inlet of the drum 50). This portion of the annular flow region 64 has a lower pressure than the average pressure in the annular flow region 64 due to the vortical flow in this region.

Since the pressure in the portion of the annular region 66 between the drum seals 70 and 74, that is, the pressure at the inlet 76a of the passage 76, is higher than the pressure in the annular flow region 64 near the protrusion 36b, that is, the pressure at the outlet 78b' of the passage 78, at least a portion of the secondary flow stream flows through the passage 76, the line 80 and the passage 78, and back into the annular flow region 64. Thus, at least a portion of the secondary flow stream in the annular region 66 is shunted back into the vortical flow stream in the annular flow region 64, thereby minimizing the possibility of undesirable mixing towards the outlet of the separator 10 and between the post-separation primary flow stream and a liquid-transporting secondary flow stream.

The chamber 88 of the vessel 26 is in fluid communication with the annular flow region 64, via the chamber 54, the port 24 and the line 22. As a result, it is understood that the operating pressure of the chamber 88 substantially corresponds to the pressure in the annular flow region 64, which is considered to be the operating pressure of the separator 10. That is, the operating pressure of the chamber 88 may be substantially the same as the pressure in the annular flow region 64 or may vary slightly therefrom due to a wide variety of factors such as, for example, any pressure distributions and/or variations within the separator 10 such as, for example, the above-described pressure drop across the separator.

The bearing assemblies 40 and 56 support the rotating shaft 46 which, in turn, supports the rotating rotor disk 49, the rotating blades 49a and the rotating drum 50. The bearing housing 38 is fluid communication with the chamber 88 of the vessel 26 via the cavity 36d, the passage 82, the line 28a, the tee 30 and the line 34. The bearing housing 55 is also in fluid communication with the chamber 88 of the vessel 26 via the bore 52e, the bore 84, the line 28b, the tee 30 and the line 34.

When the pressure in the annular flow region 64 decreases, the pressure in the chamber 88 of the vessel 26 will also decrease accordingly due to the substantial correspondence between the pressures. In response to the pressure decrease in the chamber 88, gas present in the bearing housing 38 may flow from the bearing housing to the chamber via the cavity 36d, the passage 82, the line 28a, the tee 30 and the line 34, and the operating pressure of the bearing assembly 40 will equalize substantially at or near to the pressure in the chamber 88.

In further response to the pressure decrease in the chamber 88, gas present in the bearing housing 55 may flow from the bearing housing and to the chamber via the bore 52e, the bore 84, the line 28b, the tee 30 and the line 34, and the operating pressure of the bearing assembly 56 will decrease until it is substantially equal to or near the pressure in the chamber 88.

When the pressure in the annular flow region 64 increases, the pressure in the chamber 88 of the vessel 26 will also increase accordingly due to the substantial correspondence between the pressures. In response to the pressure increase in the chamber 88, gas present in the quiescent region 92 of the chamber may flow from the quiescent region and to the bearing housing 38 via the line 34, the tee 30, the line 28a, the passage 82 and the cavity 36d, and the operating pressure of the bearing assembly 40 will increase until it is substantially equal to or near the pressure in the chamber 88. The filter 32 generally prevents any entrained liquid in the gas in the quiescent region 92 from flowing into the line 28a and to the bearing housing 38 while allowing any liquid droplets present in the lines 28a and 28b to coalesce and drain into the chamber 88.

In further response to the pressure increase in the chamber 88, gas present in the quiescent region 92 of the chamber may flow from the quiescent region and to the bearing housing 38 via the line 34, the tee 30, the line 28b, the bore 84 and the bore 52e, and the operating pressure of the bearing assembly 56 may increase until it is substantially equal to or near the pressure in the chamber 88. The filter 32 generally prevents any entrained liquid in the gas in the quiescent region 92 from flowing into the line 28b and to the bearing housing 55.

In view of the foregoing, it is understood that the bearing assemblies 40 and 56 each operate at a pressure that substantially corresponds to the pressure in the annular flow region 64. That is, the operating pressure of the bearing assemblies 40 and 56 may be substantially the same as the pressure in the annular flow region 64 or may vary slightly therefrom due to a wide variety of factors such as, for example, any pressure distributions and/or variations within the separator 10 such as, for example, the above-described pressure drop across the separator.

Liquid and/or other contaminants are substantially prevented from entering the bearing housings 38 and 55 and contacting the respective bearing assemblies 40 and 56. More particularly, the pointedly-shaped rings 42d and 42e may lift liquid from the outer surface of the casing 42, forcing this liquid to coalesce and be re-entrained by the vortical flow stream, thus preventing the liquid from flowing between the rotor disk 49 and the casings 42 and/or 58, and to the bearing housings 38 and/or 55. The pointed annular protrusion 36b' extending from the protrusion 36b may also lift any liquid from the outer surface of the protrusion 36b and present the liquid to the vortical flow stream, in a manner similar to the operation of the rings 42d and 42e.

Any liquid that is able to flow between the rotor disk 49 and the casings 42 and 58 may be prevented from flowing to the elastomer seals 48 and 62, respectively, due to a boundary layer created by the rotation of the rotor disk 49. Moreover, a disk pumping pressure may force some liquid back into the main flow stream. Also, the teeth 42c and 58c may act as slingers, slinging off any liquid that has previously flowed between the rotor disk 49 and the casings 42 and 58, respectively, back up into the vortical flow stream, thereby further preventing liquid from flowing to the respective elastomer seals 48 and 62. Finally, the elastomer seals 48 and 62 may further substantially prevent any liquid from entering the respective bearing housings 38 and 55, respectively, and contacting the respective bearing assemblies 40 and 56. Since the bearing assemblies 40 and 46 generally operate at a pressure corresponding to the pressure in the annular flow region 64, it is understood that the pressure differential across each of the elastomer seals 48 and 62 is substantially negligible, that is, the pressure on either side of each of the elastomer seals 48 and 62 is substantially equal and no appreciable or significant pressure drop is present across either of the pairs of elastomer seals 48 or 62. As a result, it is understood that the capability of the elastomer seals 48 and 62 to substantially prevent any liquid from entering the bearing housings 38 and 55, respectively, may be improved.

In view of the foregoing, it is understood that the bearing assemblies 40 and 56 are generally both pressurized and shielded, that is, the bearing assemblies generally operate at a pressure corresponding to the pressure in the annular flow region 64 while simultaneously being substantially shielded and/or isolated from liquids and/or other contaminants.

It is understood that the aforementioned sloping of the lines 28a and 28b towards the tee 30 may promote any liquid drainage to the chamber 88 of the vessel 26, via the lines 28a and 28b, at any point in time during the above-described operation of the separator 10.

Also, it is understood that the dimensions of the passage 82, the bore 84, the lines 28a and 28b, the tee 30 and the line 34 may be sized to limit fluid communication with the flow stream to minimize any potential contamination of the gas exiting the separator 10 and flowing through the tubular member 20 and the pipe section 18, and/or to minimize any potential contamination of the bearing assemblies 40 and 56.

Moreover, it is understood that the volumes of the bearing housings 38 and 55 may be minimized to only the volume required to house the bearing assemblies 40 and 56, respectively, in order to limit the amount of gas that has to travel to and/or from the bearing housings to equalize pressure therein.

Further, it is understood that one or more of the above-described connections between the different components of the separator 10 may be configured to maintain a pressure substantially equal to the pressure in the annular flow region 64. Still further, it is understood that the tubular member 20 allows for flexibility during the installation of the separator 10, and may be cut to fit to take up any axial gap present between the separator 10 and the pipe section 18.

VARIATIONS

It is understood that variations may be made in the foregoing without departing from the scope of the disclosure. For example, one or more of the components, functions, operational steps and/or features of one or more of the separators disclosed in U.S. utility patent application Ser. No. 10/983,980, filed on Nov. 8, 2004, the disclosure of which is incorporated herein by reference, may be added to and/or incorporated in the separator 10.

In another exemplary embodiment, the separator 10 may be modified so that the bearing assemblies 40 and 56 do not operate at a pressure substantially corresponding to the pressure in the annular flow region 64 and instead are cased and sealed off from the remainder of the separator. In another exemplary embodiment, the passage 76, the line 80 and the passage 78 may be removed from the separator 10. Also, one or more additional labyrinth or drum seals may be connected to the outlet housing 52.

Further, instead of or in addition to the chamber 88, a wide variety of one or more other reservoirs and/or reservoir configurations may be employed with which the bearing housings 38 and/or 55 are in fluid communication. For example, one or more additional vessels 26 may be added, with each vessel defining one or more additional reservoirs or chambers. For another example, the reservoir with which the bearing housings 38 and/or 55 are in fluid communication may be separate and independent from any type of drainage vessel and instead may be in the form of, for example, a fluid line fluidically connecting the bearing housings.

Further, it is understood that the separator 10 may include other separation systems and/or techniques in addition to or instead of rotary-type separation systems and/or methods such as, for example, vane-type separation systems.

Also, it is understood that each of the above-described lines, including one or more of the lines 22, 28a, 28b, 34 and 80, may be in a wide variety of forms such as, for example, any type of tube or tubing, flexible or otherwise, and/or may comprise a wide variety of cross-sections, and/or may include any type of conventional component through which solids, liquids and/or gases may flow.

Moreover, it is understood that the arrangement shown in FIG. 1 is only an example, and that a variety of in-line connection configurations may be used when installing the separator 10 in new pipeline and/or retrofit applications. For example, another cut-to-fit tubular member may be disposed between the pipe section 16 and the separator 10, or the tubular member 20 may be removed entirely and the separator 10 may instead be directly connected to the pipe sections 16 and 18. Also, in several exemplary embodiments, the separator 10 may be oriented in other directions such as, for example, in a vertical direction or in an angled direction.

It is understood that liquids and/or other contaminants may be separated and extracted ahead of flow meters in gas transmission lines. The separator 10 may also be used to scrub gases at compressor inlets and provide a liquid and gas separator for applications where power recovery is not needed. Other service applications of the separator 10 include, but are not limited to, gas-compressor suction and discharge applications, gas-metering station liquid and solids removal applications, contactor tower inlet and outlet applications, mobile well-test and proving unit applications, conventional separator outlet applications, with the separator 10 serving as a second-stage scrubber, gas transmission applications, and bottleneck removal applications from, for example, existing scrubbers. Moreover, it is understood that the separator 10 may be used in a wide variety of transportation, distribution and/or end-user applications.

Any spatial references, such as, for example, "upper", "lower", "above", "below", "between", "vertical", "angular", etc., are for the purpose of illustration only and do not limit the specific orientation or location of the structure described above.

In several exemplary embodiments, it is understood that one or more of the operational steps in each embodiment may be omitted. Moreover, in some instances, some features of the present disclosure may be employed without a corresponding use of the other features. Moreover, it is understood that one or more of the above-described embodiments and/or variations may be combined in whole or in part with any one or more of the other above-described embodiments and/or variations.

Although exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A Separator comprising:
   a drum having inner and outer surfaces adapted to rotate to separate substances having relatively high densities from a first flow stream,
   a first housing having inner and outer surface, the housing surrounding the drum and defining an annular region between the outer surface of the drum and the inner surface of the housing;
   wherein the first flow stream flows through a flow region at least partially defined by the inner surface of the drum and a second flow stream flows in at least a portion of the annular region; and
   means for shunting at least a portion of the second flow stream to the flow region.

2. The separator of claim 1 wherein the shunting means comprises means for fluidically connecting the at least a portion of the annular region to the flow region so that the at least a portion of the second flow stream flows from the at least a portion of the annular region and into the flow region.

3. The separator of claim 1 further comprising:
   a second housing connected to the first housing;
   wherein the connecting means comprises at least one line extending between the first and second housings and via which the at least a portion of the second flow stream flows from the at least a portion of the annular region and into the flow region.

4. The separator of claim 3 wherein the connecting means further comprises:

a first passage at least partially extending within the first housing and fluidically connected to the at least one line; and a second passage at least partially extending within the second housing and fluidically connected to the at least one line;

wherein the at least a portion of the second flow stream flows from the annular region and into the flow region via the first passage, the at least one line and the second passage.

5. The separator of claim 4 wherein the first and second passages define respective inlets and outlets; and wherein the pressure at the inlet of the first passage is greater than the pressure at the outlet of the second passage.

6. The separator of claim 3 wherein the shunting means further comprises at least one seal extending circumferentially about the drum for fluidically resisting the second flow stream.

7. The separator of claim 6 wherein the shunting means further comprises at least one other seal extending circumferentially about the drum for fluidically resisting the second flow stream, the at least one other seal being axially positioned so that the inlet of the first passage is axially positioned between the at least one seal and the at least one other seal.

8. The separator of claim 1 wherein the separator operates at a first pressure and further comprises:

a shaft connected to the drum and adapted to rotate along with the drum;

at least one bearing assembly for supporting the shaft; and means for permitting the bearing assembly to operate at a second pressure substantially corresponding to the first pressure.

9. The separator of claim 8 further comprising means for substantially shielding the at least one bearing assembly from contaminants.

10. A separator for separating substances having relatively high densities from a flow stream, the separator operating at a first pressure and comprising:

a shaft;

at least one bearing assembly for supporting the shaft;

means for permitting the at least one bearing assembly to operate at a second pressure substantially corresponding to the first pressure;

a drum connected to the shaft and adapted to rotate to separate the substances having relatively high densities from the flow stream; and wherein at least a portion of the flow stream flows through a region at least partially defined by an inner surface of the drum.

11. The separator of claim 10 wherein the at least one bearing assembly comprises a bearing housing; and wherein the permitting means comprises a reservoir in fluid communication with the bearing housing, the reservoir operating at a second pressure substantially corresponding to the first pressure.

12. The separator of claim 11 further comprising:

a first housing; and a second housing connected to the first housing, wherein the at least one bearing assembly is disposed in one of the first and second housings;

wherein the permitting means further comprises:

a passage at least partially extending within the one of the first and second housings and in fluid communication with the at least one bearing housing; and at least one line fluidically connecting the passage and the reservoir.

13. The separator of claim 12 further comprising:

at least one other bearing assembly for supporting the shaft, the at least one other bearing assembly disposed in the other of the first and second housings; and means for permitting the at least one other bearing assembly to operate at a third pressure substantially corresponding to the first pressure.

14. The separator of claim 13 wherein the means for permitting the at least one other bearing assembly to operate at a third pressure substantially corresponding to the first pressure comprises:

another passage at least partially extending within the other of the first and second housings and in fluid communication with the reservoir;

at least one other line fluidically connecting the another passage and the reservoir.

15. The separator of claim 10 further comprising:

means for substantially shielding the at least one bearing assembly from contaminants.

16. The separator of claim 15 wherein the shielding means comprises at least one sealing element sealingly engaging the shaft to substantially prevent at least a portion of the contaminants from flowing from the region to the at least one bearing assembly.

17. The separator of claim 16 wherein the pressure differential across the at least one sealing element is substantially negligible.

18. The separator of claim 15 further comprising:

at least one tubular member through which the shaft extends;

wherein the shielding means comprises at least one protrusion extending from the casing for generally slinging at least a portion of the contaminants into the at least a portion of the flow stream.

19. The separator of claim 15 wherein the shielding means comprises:

at least one ring extending circumferentially about and radially outward from the tubular member to generally lift at least a portion of the contaminants from the tubular member and into the at least a portion of the flow stream.

20. The separator of claim 15 further comprising:

a vessel for collecting the substances having relatively high densities after the substances having relatively high densities have been separated from the flow stream, the vessel defining the reservoir.

21. The separator of claim 20 wherein the shielding means comprises a filter connected to the vessel, wherein the filter is in fluid communication with the bearing assembly and the reservoir to substantially prevent at least a portion of the contaminants from flowing from the reservoir and into the bearing assembly.

22. The separator of claim 21 further comprising:

at least one tubular member through which the shaft extends;

wherein the shielding means further comprises:

at least one sealing element sealingly engaging the shaft;

at least one protrusion extending from the tubular member for generally slinging at least a portion of the contaminants into the flow stream; and at least one ring extending circumferentially about and radially outward from the tubular member.

23. The separator of claim 10 further comprising:
a drum connected to the shaft and adapted to rotate to separate the substances having relatively high densities from the flow stream,
wherein the flow stream flows through a flow region at least partially defined by an inner surface of the drum and another flow stream flows over at least a portion of an outer surface of the drum; and
means for shunting at least a portion of the another flow stream to the flow region.

24. A separator comprising:
a drum adapted to rotate to separate substances having relatively high densities from a first flow stream, wherein the first flow stream flows through a flow region at least partially defined by an inner surface of the drum and a second flow stream flows over at least a portion of an outer surface of the drum;
a first housing surrounding the drum and defining an annular region between the outer surface of the drum and the inner surface of the housing, wherein the at least a portion of the second flow stream flows in at least a portion of the annular region;
a second housing connected to the first housing;
at least one line extending between the first and second housings and via which the at least a portion of the second flow stream flows from the at least a portion of the annular region and into the flow region to shunt at least a portion of the second flow stream to the flow region;
a first passage at least partially extending within the first housing and fluidically connected to the at least one line; and
a second passage at least partially extending within the second housing and fluidically connected to the at least one line;
wherein the at least a portion of the second flow stream flows from the annular region and into the flow region via the first passage, the at least one line and the second passage;
wherein the first and second passages define respective inlets and outlets; and
wherein the pressure at the inlet of the first passage is greater than the pressure at the outlet of the second passage.

25. The separator of claim 24 wherein the separator operates at a first pressure and further comprises:
a shaft connected to the drum and adapted to rotate along with the drum;
at least one bearing assembly for supporting the shaft; and
means for permitting the bearing assembly to operate at a second pressure substantially corresponding to the first pressure.

26. The separator of claim 25 further comprising means for substantially shielding the at least one bearing assembly from contaminants.

27. A separator for separating substances having relatively high densities from a flow stream, the separator operating at a first pressure and comprising:
a shaft;
at least one bearing assembly for supporting the shaft, the at least one bearing assembly comprising a bearing housing;
at least one tubular member through which the shaft extends;
a drum connected to the shaft and adapted to rotate to separate the substances having relatively high densities from the flow stream, wherein at least a portion of the flow stream flows through a region at least partially defined by the inner surface of the drum;
a vessel for collecting the substances having relatively high densities after the substances having relatively high densities have been separated from the flow stream, the vessel defining a reservoir in fluid communication with the bearing housing so that the at least one bearing assembly operates at a second pressure substantially corresponding to the first pressure; and
means for substantially shielding the at least one bearing assembly from contaminants, the shielding means comprising:
at least one sealing element sealingly engaging the shaft to substantially prevent at least a first portion of the contaminants from flowing from the region to the at least one bearing assembly, wherein the pressure differential across the at least one sealing element is substantially negligible.

28. The separator of claim 27 wherein the shielding means further comprises:
at least one protrusion extending from the casing for generally slinging at least a second portion of the contaminants into the at least a portion of the flow stream.
at least one ring extending circumferentially about and radially outward from the tubular member to generally lift at least a third portion of the contaminants from the tubular member and into the at least a portion of the flow stream; and
a filter connected to the vessel, wherein the filter is in fluid communication with the bearing housing and the reservoir to substantially prevent at least a fourth portion of the contaminants from flowing from the reservoir and into the bearing housing.

29. The separator of claim 27 wherein another flow stream flows over at least a portion of an outer surface of the drum; and wherein the separator further comprises:
means for shunting at least a portion of the another flow stream to the region.

30. A method comprising:
rotating a drum having inner and outer surfaces to separate substances having relatively high densities from a flow stream,
surrounding the drum with a first housing having inner and outer surfaces to define an annular region between the outer surface of the drum and the inner surface of the housing;
wherein the first flow stream flows through a region at least partially define by the inner surface of the drum and a second flow stream flows in at least a portion of the annular of the annular region; and
shunting at least a portion of the second flow stream to the flow region.

31. The method of claim 30 wherein the step of shunting comprises fluidically connecting the at least a portion of the annular region to the flow region so that the at least a portion of the second flow stream flows from the at least a portion of the annular region and into the flow region.

32. The method of claim 30 further comprising:
connecting a second housing to the first housing;
wherein the step of connecting comprises connecting at least one line to the first and second housings so that the at least one line extends between the first and second housings; and
wherein the at least a portion of the second flow stream from the at least a portion of the annular region and into the flow region via the at least one line.

33. The method of claim 32 wherein the step of connecting further comprises:
providing a first passage at least partially extending within the first housing and fluidically connected to the at least one line; and
providing a second passage at least partially extending within the second housing and fluidically connected to the at least one line;
wherein the at least a portion of the second flow stream flows from the annular region and into the flow region via the first passage, the at least one line and the second passage.

34. The method of claim 33 wherein the first and second passages define respective inlets and outlets; and
wherein the pressure at the inlet of the first passage is greater than the pressure at the outlet of the second passage.

35. The method of claim 32 wherein the step of shunting further comprises providing at least one seal extending circumferentially about the drum for fluidically resisting the second flow stream.

36. The method of claim 35 wherein the step of shunting further comprises providing at least one other seal extending circumferentially about the drum for fluidically resisting the second flow stream, the at least one other seal being axially positioned so that the inlet of the first passage is axially positioned between the at least one seal and the at least one other seal.

37. The method of claim 30 wherein the separator operates at a first pressure and further comprises:
a shaft connected to the drum and adapted to rotate along with the drum; and at least one bearing assembly for supporting the shaft;
and
wherein the method further comprises:
permitting the bearing assembly to operate at a second pressure substantially corresponding to the first pressure.

38. The method of claim 37 further comprising substantially shielding the at least one bearing assembly from contaminants.

39. A method of operating a separator at a first pressure to separate substances having relatively high densities from a flow stream, the method comprising:
providing a shaft;
supporting the shaft with at least one bearing assembly;
permitting the at least one bearing assembly to operate at a second pressure substantially corresponding to the first pressure;
connecting a drum to the shaft; and
rotating the drum to separate the substances having relatively high densities from the flow stream, wherein at least a portion of the flow stream flows through a region at least partially defined by an inner surface of the drum.

40. The method of claim 39 wherein the at least one bearing assembly comprises a bearing housing; and
wherein the step of permitting comprises fluidically connecting a reservoir to the bearing housing so that the reservoir operates at a second pressure substantially corresponding to the first pressure.

41. The method of claim 40 further comprising:
providing a first housing; and
connecting a second housing to the first housing, wherein the at least one bearing assembly is disposed in one of the first and second housings;
wherein the step of permitting further comprises:
providing a passage at least partially extending within the one of the first and second housings and in fluid communication with the at least one bearing housing; and
fluidically connecting at least one line to the passage and the reservoir.

42. The method of claim 39 further comprising:
substantially shielding the at least one bearing assembly from contaminants.

43. The method of claim 42 further comprising:
connecting a drum to the shaft;
rotating the drum to separate the substances having relatively high densities from the flow stream, wherein at least a portion of the flow stream flows through a region at least partially defined by the inner surface of the drum; and
wherein the step of shielding comprises sealingly engaging the shaft with at least one sealing element to substantially prevent at least a portion of the contaminants from flowing from the region to the at least one bearing assembly.

44. The method of claim 43 wherein the pressure differential across the at least one sealing element is substantially negligible.

45. The method of claim 42 wherein the shaft extends through at least one tubular member; and
wherein the step of shielding comprises providing at least one protrusion extending from the casing to generally sling at least a portion of the contaminants into the at least a portion of the flow stream.

46. The method of claim 42 wherein the step of shielding comprises:
providing at least one ring extending circumferentially about and radially outward from the tubular member to generally lift at least a portion of the contaminants from the tubular member and into the flow stream.

47. The method of claim 42 further comprising:
collecting the substances having relatively high densities in a vessel after the substances having relatively high densities have been separated from the flow stream, wherein the vessel defines the reservoir.

48. The method of claim 47 wherein the step of shielding comprises connecting a filter to the vessel, wherein the filter is in fluid communication with the bearing assembly and the reservoir to substantially prevent at least a portion of the contaminants from flowing from the reservoir and into the bearing assembly.

49. The method of claim 39 further comprising:
connecting a drum to the shaft;
rotating the drum to separate the substances having relatively high densities from the flow stream,
wherein the flow stream flows through a flow region at least partially defined by an inner surface of the drum and another flow stream flows over at least a portion of an outer surface of the drum; and
shunting at least a portion of the another flow stream to the flow region.

* * * * *